United States Patent

Wessel et al.

[11] 4,227,500
[45] Oct. 14, 1980

[54] FUEL INJECTION APPARATUS

[75] Inventors: Wolf Wessel, Oberriexingen; Volkhard Stein, Stuttgart; Rudolf Sauer, Benningen; Wolfgang Kienzle, Schwieberdingen, all of Fed. Rep. of Germany

[73] Assignee: Robert Bosch GmbH, Stuttgart, Fed. Rep. of Germany

[21] Appl. No.: 945,048

[22] Filed: Sep. 22, 1978

[30] Foreign Application Priority Data

Sep. 23, 1977 [DE] Fed. Rep. of Germany ...... 2742796

[51] Int. Cl.$^3$ .................................................. F02M 39/00
[52] U.S. Cl. .................................. 123/455; 261/44 A; 261/50 A
[58] Field of Search ............... 123/139 AW, 139 BG; 261/44 R, 44 A, 50 R, 50 A

[56] References Cited

U.S. PATENT DOCUMENTS

| | | | |
|---|---|---|---|
| 3,823,696 | 7/1974 | Mutschler et al. | 123/139 AW |
| 4,108,117 | 8/1978 | Stumpp et al. | 261/44 A |
| 4,108,128 | 8/1978 | Knapp | 123/139 AW |
| 4,154,203 | 5/1979 | Peters et al. | 261/44 A |
| 4,184,466 | 1/1980 | Nagele | 123/139 AW |

FOREIGN PATENT DOCUMENTS

2720335 11/1978 Fed. Rep. of Germany ........ 261/44 A

Primary Examiner—Ira S. Lazarus
Assistant Examiner—Magdalen Moy
Attorney, Agent, or Firm—Edwin E. Greigg

[57] ABSTRACT

A fuel injection apparatus is proposed for mixture-compressing, externally ignited internal combustion engines which serves to apportion a quantity of fuel corresponding to the aspirated air quantity and to effect good preparation of the fuel-air mixture. The fuel injection apparatus comprises a fuel apportionment valve which is actuatable by means of an air flow rate meter arranged in the air induction tube of the internal combustion engine and an arbitrarily actuatable throttle valve arranged downstream of the air flow rate meter. The air flow rate meter has a circular control body, which is rotatably arranged on a bearing shaft with its outer circumference facing in the opposite direction to the air flow and, being transversely arranged with respect to the air induction tube, opens to a greater or lesser degree an aperture which defines the air induction tube cross-sectional area. The air flow rate meter is moved against a return force in accordance with the air quantity flowing therethrough.

18 Claims, 12 Drawing Figures

FUEL INJECTION APPARATUS

BACKGROUND OF THE INVENTION

The invention relates to a fuel supply device for mixture-compressing, externally ignited internal combustion engines with a throttle member arranged in the air intake manifold so as to be arbitrarily activatable, and an air metering member, which is deflected against a return force according to the air flow rate and thereby activates a fuel metering device. In addition, the fuel metering device has a control slit, which, in turn, opens a control groove to a greater or lesser degree to meter the fuel and the metered fuel quantity is injected into the air intake manifold, especially by means of a nozzle. A fuel injection apparatus is already known in which the length of the apparatus, because of the limited available space in the engine compartment of a vehicle, causes difficulties in installation. It is further disadvantageous in the known fuel injection apparatus that the fuel apportionment valve and the injection point are at a relatively great distance from one another. Accordingly, because of the delay in the requisite quantity of fuel being able to reach the induction tube particularly during quick acceleration the engine is underpowered and hesitates due to lack of fuel. It is further disadvantageous that there is insufficient mixture delivery downstream of the fuel injection point, so that a poorly prepared fuel-air mixture is fed to the engine.

OBJECT AND SUMMARY OF THE INVENTION

The fuel injection apparatus according to the invention has the advantage over the known device that it can be very small structurally and thus enables installation in the motor compartment even where only a limited amount of space is available.

The principal object of the present invention is to provide an air flow rate meter as a circular control body which is rotatably disposed on a bearing shaft at the entrance to the air induction tube and is arranged in the air induction tube in such a way that a sector of the control body opposes the air flow and provides positive and accurate feeding of the air supply to the fuel injection jet.

Another object of the invention is to provide the sector with an injection jet and the fuel supplied by the apportionment valve to the air induction tube is fed to said jet.

Still another object of the invention is to provide the outer surface of the sector of the control body with an offstanding protuberance which assists in directing the entrance air toward the fuel injecftion jet.

Yet another object of the invention is to provide the sector of the control body in the form of an airfoil and have disposed therebeneath on the bearing shaft an air blocking member to prevent cavitation in the fuel supply.

A further object of the invention is to achieve the most ideal preparation of the fuel-air mixture whereby the fuel consumption of the internal combustion engine and the proportion of toxic components discharged from the exhaust thereof are significantly reduced.

The invention will be better understood as well as further objects and advantages thereof become more apparent from the ensuing detailed description of preferred embodiments taken in conjunction with the drawings.

DESCRIPTION OF THE PREFERRED EMBODIMENTS

Figure 1:
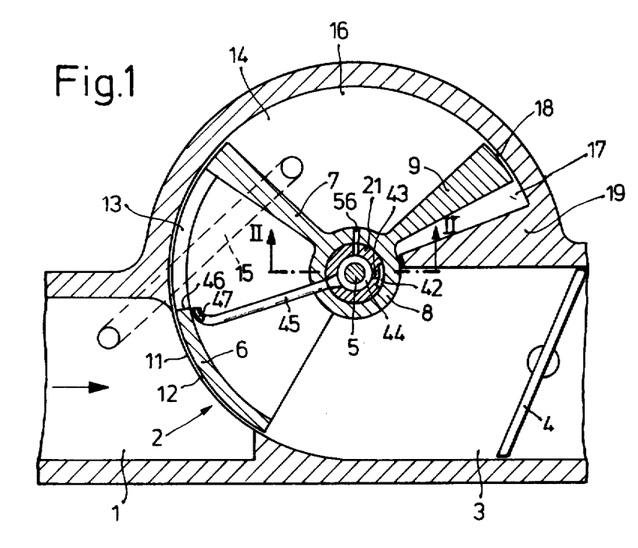
FIG. 1, a cross-sectional view of a first exemplary embodiment of a fuel injection apparatus disclosed by this application.

In the fuel injection apparatus shown in FIG. 1, the air required for combustion flows in the direction of the arrow into a section 1 of the air induction tube, which has arranged within it an air flow rate meter 2, and further flows through a section 3 of the air induction tube, which includes an arbitrarily actuatable throttle valve 4, to one or more cylinders (not shown) of an internal combustion engine. The air flow rate meter 2 is rotatably fixed about a rigid bearing shaft 5, which is placed transversely with respect to the air induction tube, and has a control body 6, which communicates via a radial bridge 7 with a bearing hub 8 of the air flow rate meter, and a damping vane 9, which also communicates with the bearing hub 8. The bearing shaft 5 of the air flow rate meter 2 is arranged downstream of an aperture 11 which defines the air induction tube cross-sectional area.

The control body 6 is embodied as a tubular segment and is fixed transversely across the air induction tube with its outer baffle-like circumferential wall 12 disposed toward the direction of the air flow. In an opening movement of the control body in a counterclockwise direction, a control opening 13 of the control body 6 more more less uncovers the aperture 11 and thus opens a particular cross-sectional area of the air induction tube. Accordingly, in an opening movement of the control body 6, it moves into the air induction tube section 3, while in a closing movement it is diverted into a recess 14 of the air induction tube which, separated by the bridge 7 from the induction tube section 3, communicates via a line 15 with atmospheric pressure or with the induction tube section upstream of the control body. The recess 14 serves at the same time as a damping chamber, in which the damping vane 9 is swingably fixed. The damping vane 9 divides the damping chamber 14 into a pressure chamber 16, in which the pressure upstream of the control body 6 prevails, and a throttle chamber 17, which communicates with the throttle chamber via a throttle point 18, formed by the gap between the circumference of the damping vane and the wall of the recess 14. The throttle chamber 17 is defined on one side by the damping vane 9 and on the other by an integral wall 19 which separates the throttle chamber from the induction tube section 3. The damping vane 9 serves to damp the movement of the control body 6, by which means induction tube pressure fluctuations caused by induction strokes have practically no influence on the angle of attitude of the control body 6. The control body 6 which is embodied as a rotary slider moves within the complementally shaped air induction tube section 1 in accordance with a nearly linear function of the air quantity flowing through the air induction tube, while at a constant air pressure prevailing in front of the control body, the pressure prevailing between the control body and the throttle valve 4 likewise remains constant. The diversion of the air flow rate meter 2 takes place against the force of a spiral spring 20 (shown in FIG. 2) which serves as a return force, which communicates at one end with a bushing 21 connected with the bearing hub 8 and at the other end with a stop 22 on the air induction tube. The basic setting of the fuel apportionment valve described below can be changed by rotating the bearing shaft 5 by means of an adjusting lever 23 and an adjusting screw 24, which is supported on a stop 22 on the housing.

Figures 2, 3:
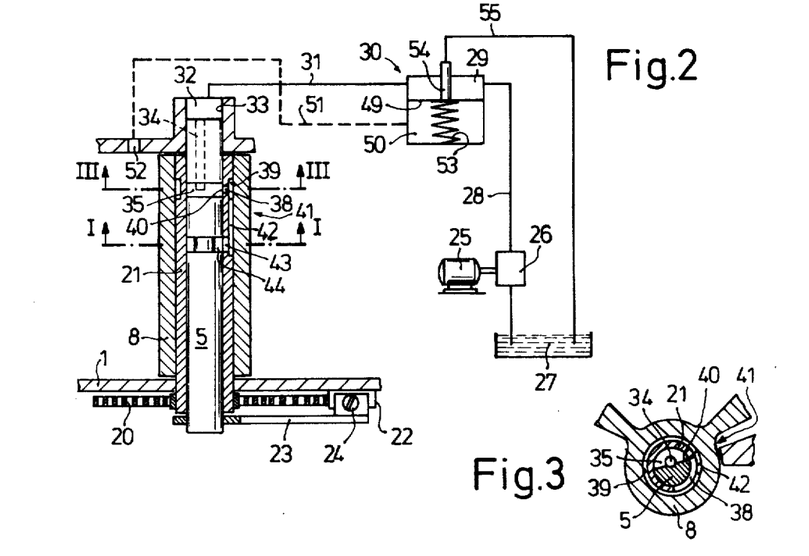
FIG. 2, a sectional view along the line II—II of FIG. 1.
FIG. 3, a sectional view along the line III—III of FIG. 2.

Turning now to FIG. 2, it will be seen that fuel is supplied to the fuel injection apparatus by an electric motor 25 which drives a fuel pump 26 that aspirates fuel from a fuel container 27 and delivers it via a line 28 to a chamber 29 within a differential pressure valve 30. From the chamber 29, fuel flows through a line 31 into a chamber 32 which is defined by the end face of the bearing shaft 5 and its guide bore 33. A bore 34, shown in broken lines in FIG. 2, establishes communication of the chamber 32 with a groove 35 worked into the bearing shaft 5. The bushing 21 has a control slot 38 terminating in an annular groove 39. The control slot 38 cooperates with a control edge 40 (see FIG. 3) which is formed by the end surface of the groove 35 in the bearing shaft. Depending on the position of the control body 6 the control edge 40 opens the control slot 38 to varying degrees for apportioning a fuel quantity proportional to the aspirated air flow rate. Thus, the control edge 40 and the control slot 38 together form a fuel apportionment valve 41 within the bearing shaft 5 of the air flow rate meter 2. From the annular groove 39 the measured fuel travels through a groove 42 and an opening 43 in the bushing 21 into an annular groove 44 of the bearing shaft 5. The annular groove 44 communicates with a line 45 (FIG. 1), which empties near a control surface 46 of the control opening 13 via an injection jet 47, so that the apportioned fuel can be injected into the airstream which flows through the aperture opened by the control edge 46. The line 45 can also, as is not shown, be connected with several injection jets 47 arranged on the control edge 46. An injection gap which extends across nearly the entire width of the aperture 11 can also serve as injection jet 47. Furthermore, as is not shown, the injection jet 47 can be replaced by an injection valve.

Figure 10:
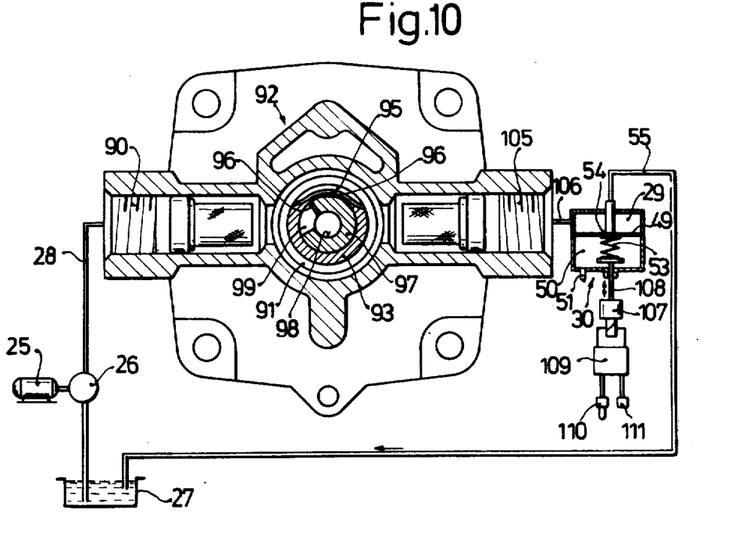
FIG. 10, a cross-sectional view along the line X—X of FIG. 8.

Fuel is apportioned at the metering valve 41 with a constant pressure differential. For this purpose, a chamber 50, which is separated from the chamber 29 of the differential pressure valve 30 by a diaphragm 49, communicates with the air induction tube section 1 upstream of the control body 6 through an air line 51 shown by a broken line and through a bore 52, so that the same pressure prevails in the chamber 50 as downstream of the control slot 38. The differential pressure valve 30 is urged to close by a spring 53 within the chamber 50. The force of the spring 53 can be varied in accordance with operational characteristics of the internal combustion engine. To this end an electromagnet, for example, can contact the spring 53 as shown in FIG. 10, or a supplementary force dependent on operational characteristics can act directly on the diaphragm 49 parallel to the spring 53. The differential pressure valve 30 is embodied as a flat seat valve whose diaphragm 49 is its movable valve member which cooperates with a fixed valve seat 54 over which fuel may flow into a return line 55 which terminates in the fuel container 27.

It is advantageous to add supplementary air to the apportioned fuel before it is injected into the air induction tube. To this end, the annular groove 44 communicates via an opening 56 with the pressure chamber 16, as is shown in FIG. 1, in which chamber the pressure upstream of the control body 6 prevails. Supplementing the apportioned fuel quantity with air before it is injected into the air induction tube has the advantage of a better mixture preparation and a better fuel transport to the injection jet 47.

The above-described fuel injection system according to the present invention operates as follows:

When the engine is running, the fuel pump 26 aspirates fuel from the container 27 and delivers it through the line 28 to the fuel apportionment valve assembly 41 (FIG. 3). At the same time, the engine aspirates air through the air induction tube sections 1 and 3, so that an underpressure arises in induction tube section 3, by means of which the control body 6 experiences a certain rotation out of its rest position.

According to the rotation of the control body 6, the control surface 12 opens the aperture 11 to a greater or lesser degree. The direct control of the fuel apportionment valve 41 by the air flow rate meter 2 results in an essentially constant ratio of aspirated air to metered fuel when the return force and air pressure are constant. The fuel is apportioned at a pressure differential held constant by the differential pressure valve 30 so that by changing the closing force on the diaphragm 49, especially by means of the force of spring 53, a matching to the various operational values of the engine is possible by changing the pressure differential. The injection of the apportioned fuel takes place via the injection jet 47 near the control edge 46, that is, at the point of highest air flow rate, in order to achieve as homogeneous as possible a fuel-air mixture. This embodiment of the fuel injection apparatus permits the arrangement of the throttle valve 4 very close to the swivel range of the control body 6 and thus effects a space-saving structure for the fuel injection apparatus. Furthermore, the short transport paths between fuel apportionment valve 41 and fuel injection jet 47 make possible a rapid variation in drivability at load conditions which are changing.

Figure 4:
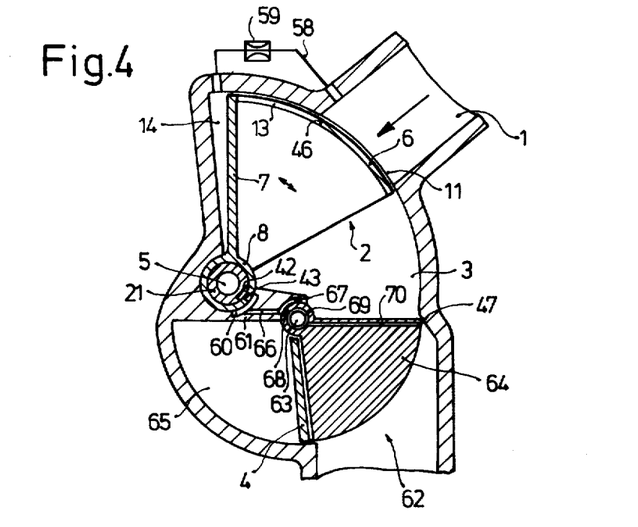
FIG. 4, a cross-sectional view of a second exemplary embodiment of a fuel injection apparatus disclosed by this application.

In the fuel injection apparatus shown in FIG. 4, the parts which are the same as those in FIGS. 1-3 have the same reference numerals. In this embodiment as well there is an air flow rate meter 2 with a control body 6 formed as a tubular segment, which is presented at its outer face with the aspirated air and swings out of the induction tube recess 14 in an opening movement. The recess 14 communicates via a line 58 which has a throttling means 59 with the air induction tube section 1 upstream of the control body 6, so that a damped changed in attitude of the control body 6 results. Fuel supply and fuel apportionment takes place, as in the embodiment shown in FIGS. 1-3, in the bearing shaft 5. The fuel apportioned at the fuel apportionment valve 41 flows via the groove 42 and a bore 43 of the bearing hub 8 into a groove 60 provided in a projection 61 of the induction tube wall. Positioned as closely as possible to the bearing shaft 5 of the air flow rate meter 2, a throttle device 62 is rotatably fixed about a shaft 63, which comprises the throttle valve 4 and a preparation device 64 and thereby controls the induced air quantity downstream from the air flow rate meter 2. The throttle valve 4 and preparation device 64 are rotatably fixed coaxially relative to the shaft 63 and swing during an opening movement into a recess 65 of the air induction tube. The preparation device 64, which is embodied in the shape of a cylindrical segment, contacts the throttle valve 4 when the latter is in idling position and nearly completely closes the cross-sectional area of the air induction tube downstream of the control body 6. Between the circumference of the preparation device 64 and the wall of the recess 65 there is provided an amount of play such that in a clockwise opening movement of the throttle valve 4 the induction tube pressure downstream of the preparation device 64 prevails in the recess 65 between the throttle valve 4 and the preparation device 64, so that the preparation device, by reason of the varying pressure forces contracting it, is urged against a spiral spring (not shown) as the return force, likewise in a clockwise direction. The spiral spring is designed so that at the preparation device in the full-load position of the throttle valve a certain minimal pressure drop is still capable of being maintained. The apportioned fuel is carried advantageously from the groove 60 via a line 66 in the projection 61 to a groove 67, which communicates via a bore 68 and an annular groove 69 with a line 70 in the preparation device 64, which empties via an injection jet 47 near the narrowest cross-sectional area of the air induction tube which is controlled by the preparation device 64. The preparation device 64 assures that even in the full-load range of the internal combustion engine a very good preparation of the fuel-air mixture is accomplished. In this embodiment as well, besides a small space requirement, short transport paths for the fuel to the injection point and a good preparation of the fuel-air mixture are attained.

Figure 5:
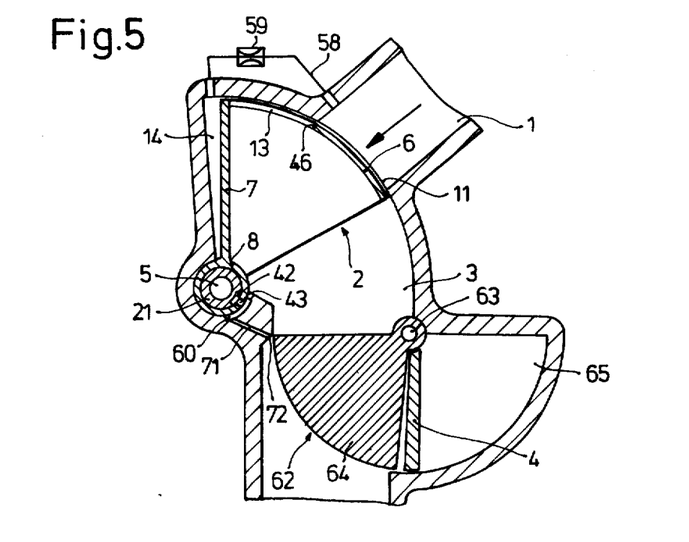
FIG. 5, a cross-sectional view of a third exemplary embodiment of a fuel injection apparatus disclosed by this application.

The functioning of the fuel injection apparatus shown in FIG. 5 corresponds essentially to the fuel injection apparatus shown in FIG. 4, so that the same parts have the same reference numerals. In contrast to the embodiment of FIG. 4, throttle valve 4 and preparation device 64 are fixed on the shaft 63 on the opposite side of the air flow rate meter 2 from the bearing shaft 5 of the air flow rate meter 2. In this embodiment, the fuel apportioned at the fuel apportionment valve is injected, via a line 71 and an injection jet 72, which is located on the induction tube wall integral with the housing, into the narrowest flow-through cross-sectional area of the air induction tube which is opened up between the preparation device 64 and the induction tube wall. This embodiment has the advantage, besides the very short transport path between fuel apportionment valve and fuel injection jet 72, that because of the integral arrangement of the injection jet 72 there is no variation in alignment of the injections, which would undesirably influence the preparation of the fuel-air mixture.

Figure 6:
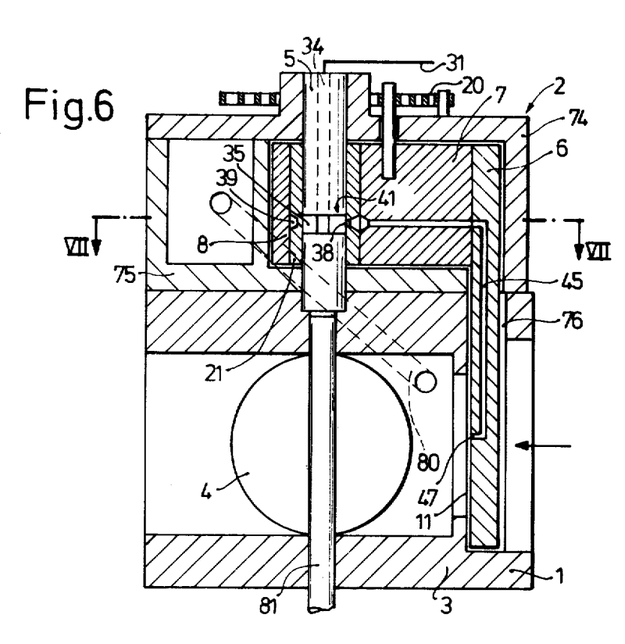
FIG. 6, a cross-sectional view of a fourth exemplary embodiment of a fuel injection apparatus disclosed by this application.
Figure 7:
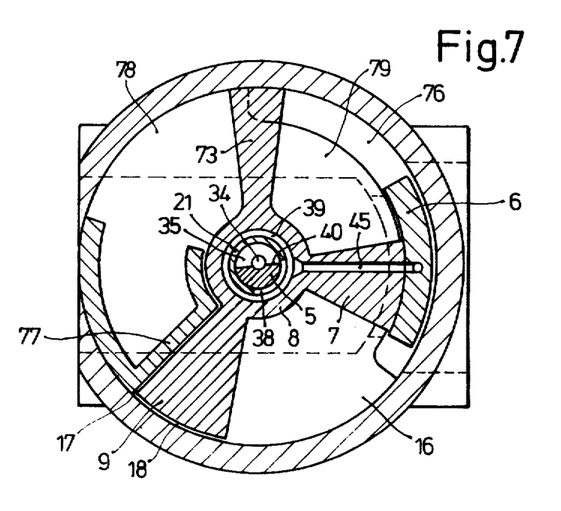
FIG. 7, a cross-sectional view along the line VII—VII of FIG. 6.

In the further embodiment of a fuel injection apparatus according to FIGS. 6 and 7, the parts which are the same as those in the previous embodiments again have the same reference numeral. Here the air flow rate meter 2 has a damping vane 9, a working vane 73 and a control body 6 which is connected by means of bridge 7 with the damping vane 9 and the working vane 73. The bearing shaft 5 of the air flow rate meter 2 is so arranged that the working vane, damping vane and bridge are swingable in a plane parallel to the axis of the air induction tube. The control body 6 of the air flow rate meter 2 which is connected with the bridge 7 is embodied in the form of a tubular segment and projects through the induction tube wall in such a way that when it swings it opens the aperture 11, thereby defining the air induction tube cross-sectional area, more or less widely. The bridge 7, damping vane 9 and working vane 73 are enclosed by housing parts 74 and 75. The control body 6 moves when it swivels within a partial annular groove 76 which penetrates the housing subpart 75, in the direction of the air induction tube 1. The bridge 7, damping vane 9, working vane 73 and a radial wall 77 of the housing subpart 75 which is integral with the housing divide the housing formed by housing parts 74 and 75 into the pressure chamber 16, the throttle chamber 17, a working chamber 78 and a swivel chamber 79. Pressure chamber 16 and swivel chamber 79 are separated from one another by bridge 7 and are connected with the induction tube section 1 upstream of the control body 6 via the partial annular groove 76. The throttle chamber 17 formed between the wall 77 and the damping vane 9 communicates with the pressure chamber 16 via the throttle gap 18 which is provided between the circumference of the damping vane and the chamber wall. The working chamber 78 which is separated from the swivel chamber 79 by the working vane 73 communicates with the induction tube section 3 between control body 6 and throttle valve 4 via an air line 80. The working chamber 78 is defined on one side by the working vane 73 and on the other by the radial wall 77. Because of the different pressure forces acting on both sides of the working vane 73, the working vane and thus the control body 6 and the damping vane 9 are swivelled more or less away from their position of rest against the force of the spiral spring 20. The fuel supply takes place, as shown in FIG. 2 and described above, via the line 31. The fuel apportionment within the bearing of the air flow rate meter 2 and the injection, via a line 45 and an injection jet 47 located in the control body 6, into aperture 11 are both advantageous in this embodiment. The design according to the invention of the fuel injection apparatus of FIGS. 6 and 7 permits an arrangement of the throttle valve shaft 81 in the induction tube section 3 between a plane which runs through the longitudinal axis of the bearing shaft 5 and the aperture 11. Thus, the invention here provides a structural mode which is very compact and also provides a very short transport path between the fuel apportionment valve 41 and injection jet 47. The function of this embodiment corresponds to that of the embodiments described previously.

Figure 8:
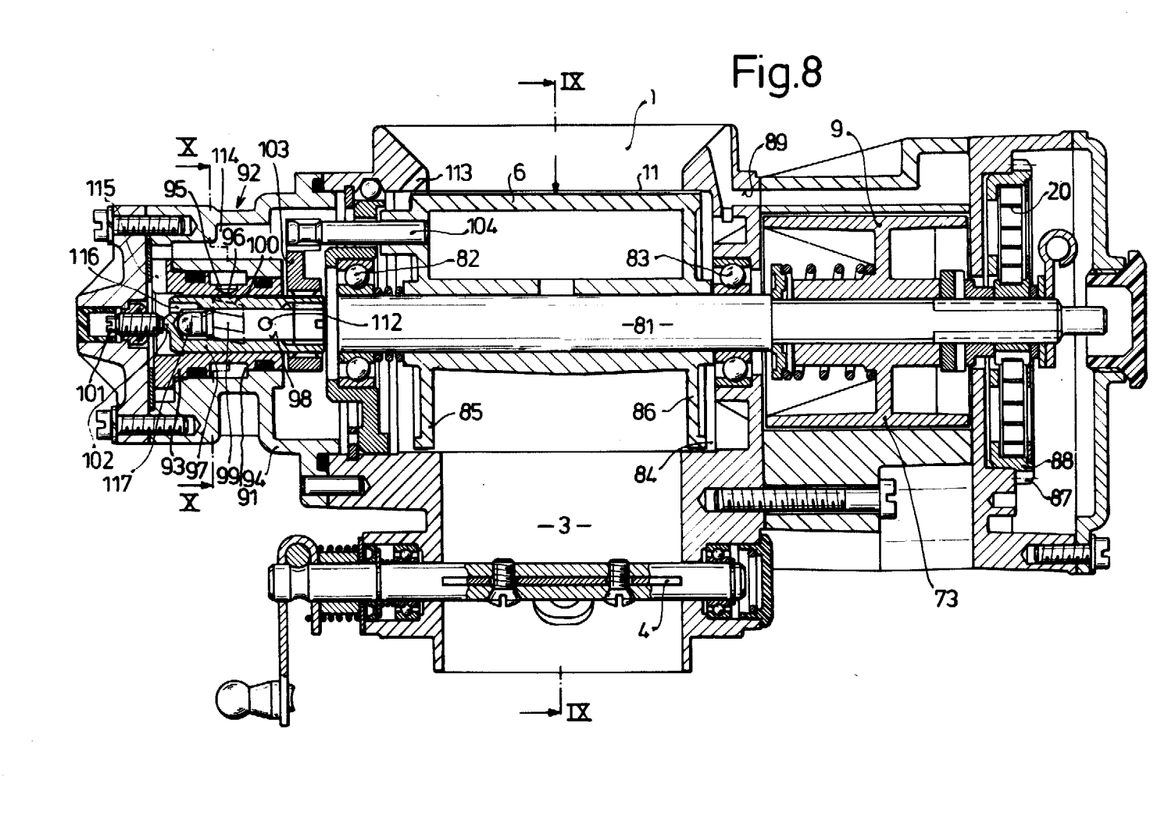
FIG. 8, a cross-sectional view of a fifth exemplary embodiment of a fuel injection apparatus disclosed by this application.
Figure 9:
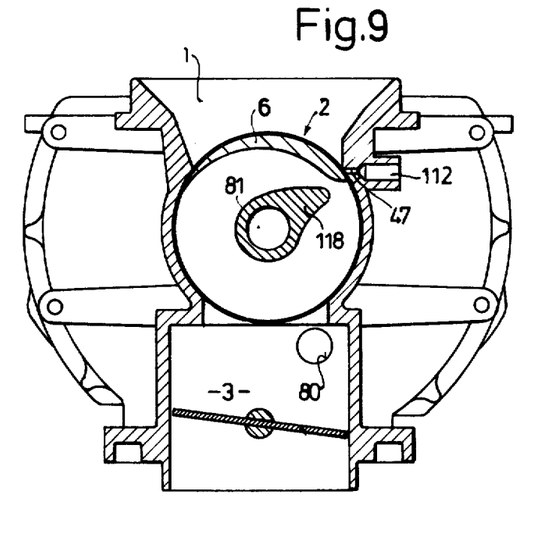
FIG. 9, a cross-sectional view along the line IX—IX of FIG. 8.

In the exemplary embodiment of FIGS. 8, 9 and 10, the parts which remain the same as those in the embodiments which have already been described are again given the same reference numerals.

Thus, in the fuel injection apparatus of FIG. 8, the air required for combustion flows via an air filter (not shown) in the direction of the arrow into the air induction tube 1, in which is disposed the control body 6 of the air flow rate meter 2 that is swingably supported therein on a bearing shaft 81, and thence flows through the induction tube section 3 with the arbitrarily actuatable throttle valve 4 to one or more cylinders (not shown) of the internal combustion engine. The bearing shaft 81 which is securely connected with the control body 6 is fixed in the wall of the induction tube section 1 via ball bearings 82 and 83. The control body 6 is placed transversely with respect to the induction tube section 1 in a circular recess 84 and includes closure wall means 85 and 86 which are disc-shaped and arranged to project in opposite directions into this recess 84. These closure wall means 85 and 86 are integral with the control body 6 of the air flow rate meter 2, said control body being in the shape of a cylinder and arranged to control the flowthrough cross-sectional area of the air induction tube section 1.

Accordingly, the cylindrical control body 6 of the air flow rate meter 2 is embodied so that when air is not flowing the aperture 11 is closed by the control body and with an increasing quantity of induced air the aperture 11 is opened more and more widely. The control body 6 of the air flow rate meter 2, as will be best understood from the view of FIG. 9, is intended to influence the air stream as little as possible when the aperture is fully open.

Deflection of the air flow rate meter 2 in a counterclockwise direction takes place against the force of a spiral spring 20, which is connected at one end with the bearing shaft 81 and at the other end with a ring 88 which includes a toothed gear 87. The ring 88 can be rotated by means of a pinion and can be stopped by means of locking screws via the toothed gear 87, in a manner which is not shown.

The damping vane 9 (FIG. 8) is likewise connected with the bearing shaft 81 of the air flow rate meter 2 and performs a rotary movement in an annular area which corresponds to the rotary movement of the air flow rate meter 2. This annular area is divided into a pressure chamber 16 and a throttle chamber 17 by means of the damping vane 9 (see FIG. 7) and a radial bridge, not shown, which is integral with the housing. Thus, the pressure chamber 16 communicates via a line 89 with the induction tube section 1 upstream of the control body 6, and the throttle chamber 17 communicates with the pressure chamber via a throttle point, not shown. The arrangement of the vane 9 has a damping effect on the adjustment movement of the air flow rate meter 2, so that the induction tube pressure fluctuations caused by induction strokes have practically no influence on the angle of attitude of the air flow rate meter 2. The control body 6 moves within the complementally shaped recess 84 of the induction tube section 1 according to a nearly linear function of the air quantity flowing through the air induction tube. Thus, if the air pressure prevailing in front of the control body 6 remains constant, the pressure prevailing between the control body 6 and the throttle valve 4 will also remain constant.

The delivery of fuel to the fuel supply apparatus takes place, as is shown in FIG. 10, for example by means of the fuel pump 26 which is driven by an electric motor 25, which pump 26 induces fuel from a fuel container 27 and delivers it via the fuel supply line 28 to a nipple 90 through which the fuel flows into an annular groove 91 of the fuel apportionment apparatus 92. The annular groove 91 is embodied within a guide tube 93, which is fixed within the housing 94 of the fuel apportionment apparatus in such a awy that it cannot rotate. The annular groove 91 communicates via a delivery recess 95 with a control slit 96 which is radially embodied in the guide tube 93. A rotation tube 97 provided with an interior bore 98 and a radially extending control groove 99 (see FIG. 8) is rotatably and slidably positioned within the guide tube 93. The control groove 99 has at least one control edge 100, which opens the control slit 96 more or less widely in accordance with the position of the rotation tube opposite the guide tube. As is shown in FIG. 8 in dashed lines, the control edge 100 is embodied in a manner that is oblique relative to the central axis of rotation tube 97, so that by axial displacement of the rotation tube 97 with respect to the guide tube 93, the control slit can be opened more or less widely by the control edge 100. By this means the basic setting of the fuel apportionment apparatus 92 can be adjusted. The axial adjustment of the rotation tube 97 can be sensitively accomplished for example via an adjustment screw 101, which is arranged to contact the free end of the rotation tube 97 with as little friction as possible via a protrusion 102. The rotation tube 97 and control body 6 are connected by a coupling means comprising a coupler part 103 and a coupler bolt 104, which is connected with the end wall 85 of the control body and projects into the coupler part 103, so that in a rotary movement of the air flow rate meter 2 (see FIG. 1) a quantity of fuel is apportioned at the control slit 96 which is proportional to the quantity of induced air. It is desirable to permit the coupler bolt 104 to project into the coupler part 103 at the greatest possible distance from the axis of the rotation tube, so that the apportionment error caused by the unavoidable play between the coupler bolt 104 and the coupler part 103 remains as small as possible.

The fuel apportionment at the control slit 96 of the fuel apportionment apparatus takes place at a constant pressure differential. To this end, the annular groove 91 (see FIG. 10) communicates via a discharge nipple 105 and a line 106 with the chamber 29 of the differential pressure valve 30. The chamber 29 of the differential pressure valve 30 is divided by the diaphragm 49 from the chamber 50 of the differential pressure valve, with the latter chamber being arranged to communicate via a line 51 with the induction tube section 1 upstream of the control body 6. A spring 53 is arranged in the chamber 50 and urges the diaphragm 49 in the closing direction of the differential pressure valve. The force of the spring 53 can be varied in accordance with operational characteristics of the internal combustion engine. An electromagnet 107 which contacts the spring 53 via an actuation pin 108, for example, can serve this purpose, or a supplementary force which is dependent on operational characteristics can act directly on the diaphragm 49 parallel to the spring 53. The electromagnet 107 can be controlled, for example, by an electronic control device 109 by means of the signal of an oxygen sensor 110 arranged in the exhaust line of the internal combustion engine which measures the partial pressure of the exygen, or by a temperature indicator 111. The control of the force which acts on the diaphragm 49 could also be accomplished, for example, by means of a bimetallic spring in accordance with the operational characteristics of the internal combustion engine. The differential pressure valve 30 is formed as a flat seat valve, having the diaphragm 49 which includes a rigid valve seat 54 as the movable valve element. Thus, with this arrangement excess fuel can flow into a return flow line 55, which empties into the fuel tank 27. The differential pressure valve simultaneously serves as the system pressure valve.

The fuel apportioned at the control slit 96 of the fuel apportionment apparatus 92 flows from the inner bore 98 of the rotation tube 97 via a fuel line 112 to the injection jet 47 (see FIG. 1) in the wall of the induction tube 1 immediately upstream of the aperture 11 which is opened by the control body 6, so that the fuel is injected within the range of the highest air flow speed, by means of which an excellent spreading of the injected fuel results.

To achieve a better fuel-air mixture it is useful to supplement the fuel apportioned at the control slit 96 of the fuel apportionment apparatus 92 with air via an air line before it is injected into the air induction line. To this end, air can flow out of the induction tube section 1 upstream of the control body 6 via an opening 113 into a bore 114 and a radial bore 115 of the fuel apportionment apparatus 92 and from there into a longitudinally disposed bore 116, which empties into the inner bore 98 of the rotation tube 97. In order to prevent fuel from being inadvertently discharged from the system, especially under small pressure differentials and large fuel quantities, a filter 117 having a fine-meshed web is arranged in the inner bore 98. The filter 117 with its fine-meshed web provides an obstacle for the fuel because of the large surface constraint, but air can easily pass through the longitudinal bore 116. The filter web can be made, for example, of fine metallic or synthetic fibers. The filter 117 thereby serves as an inexpensive and effective method of preventing the metered fuel from returning upstream, while also providing passage for air that is to be added to the fuel for an improved spreading thereof by means of an air line.

As in the exemplary embodiment according to FIGS. 6 and 7, the air flow rate meter of FIGS. 8 and 9 has a working vane 73 connected to the bearing camshaft 81, which working vane 73, being swingably fixed in a working chamber, is acted on by the induction tube pressure upstream of the control body via a line 89 on one side and on the other side by the induction tube pressure between the barrier body and throttle valve via a line 80, so that the adjustment movement of the control body 6 and thus the control of the flow-through cross-sectional area at the aperture 11 takes place in accordance with the pressure forces contacting the working vane 73. In an advantageous manner the control body 6, working vane 73 and damping vane 9 are fixed coaxially on the bearing camshaft 81, with the damping vane 9 and working vane 73, however, being arranged outside the induction tube. By means of the arrangement of the damping vane 9 and the working vane 73 being positioned outside of the induction tube coaxially with the control body 6, a low structural height is again accomplished for the fuel injection apparatus.

In order to accomplish the most effective air flow control when the control body 6 is fully opened, it is desirable to equip the control body 6, as shown in FIG. 9, with an airfoil shaped cross-section. It can also be advantageous to equip the bearing shaft 81 of the control body 6 with a guide body 118, in order to prevent the fuel-air mixture from being carried inconveniently into a so-called dead space.

Figure 11:
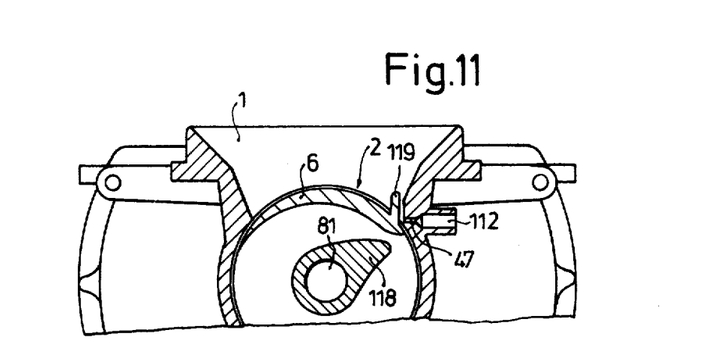
FIG. 11 depicts a fragmentary cutaway view of the fuel injection apparatus according to FIG. 8 showing a guide nose on the control body and a guide body on the bearing shaft.

A further possibility for better preparation of the fuel-air mixture is shown in FIG. 11, in which a guide nose 119 that is integral with the control body 6 in the area of the injection jet 47 extends in a direction counter to the air flow direction and thus directs the air flow onto the fuel injection jet 47 in a more positive manner, at least in the lower load range.

Figure 12:
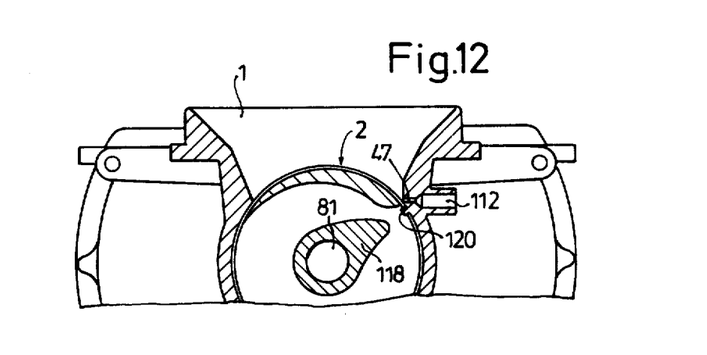
FIG. 12 depicts a fragmentary cutaway view of a fuel injection apparatus according to FIG. 8 with a preparation stub arranged to project into the air induction tube.

It can also be advantageous, as FIG. 12 shows, to provide a sharp-edged stub or protrusion 120 on the wall of the induction tube directly downstream of the injection jet 47, at which point the thin film of fuel which forms on the induction tube wall is carried away by the air flowing past it because the air speed is higher in that area and, as a consequence, a better fuel preparation results.

The foregoing relates to preferred embodiments of the invention, it being understood that other embodiments and variants thereof are possible within the spirit and scope of the invention, the latter being defined by the appended claims.

What is claimed and desired to be secured by Letters Patent of the United States is:

1. In a fuel injection apparatus for mixture-compressing, externally ignited internal combustion engines having an air induction tube into which continuous injection is maintained, the apparatus including: an arbitrarily actuatable throttle valve mounted in the air induction tube; a bearing shaft; an air flow rate meter mounted by the bearing shaft to the air induction tube in series with the throttle valve; means connected to the air flow rate meter for providing a return force to the air flow rate meter, the force varying in accordance with the air quantity flowing through the air induction tube; a fuel apportionment valve having a movable part which controls the fuel apportioned by the fuel apportionment valve; a fuel line connected to the fuel apportionment valve through which fuel is delivered to the fuel apportionment valve for apportionment by said movable part, the air flow rate meter being connected to the fuel apportionment valve to control the fuel apportionment valve in accordance with the air quantity flowing through the air induction tube, so that the fuel apportioned by the movable part is a function of the air quantity flowing through the air induction tube, the improvement wherein:
 (i) the air flow rate meter includes a control body having a circularly embodied outer circumferential wall rotatably mounted to the bearing shaft transversely to the direction of air flow in the air induction tube so that the circularly embodied outer circumferential wall faces opposite the direction of air flow in the air induction tube; and
 (ii) the circumferential wall controls, to a varying extent, a cross sectional opening of the air induction tube.

2. The improved fuel injection apparatus as defined in claim 1, wherein:
 (iii) the air flow rate meter further includes: means defining a damping chamber; a damping vane mounted for pivotal movement within the damping chamber; and a throttle;
 (iv) said damping vane dividing the damping chamber into a pressure chamber and a throttle chamber, said pressure chamber being in communication with atmospheric pressure, and said throttle chamber being in communication through said throttle with said pressure chamber.

3. The improved fuel injection apparatus as defined in claim 1, wherein:
   (iii) the air flow rate meter further includes: means defining a damping chamber; a damping vane mounted for pivotal movement within the damping chamber; and a throttle;
   (iv) said damping vane dividing the damping chamber into a pressure chamber and a throttle chamber, said pressure chamber being in communication with the air induction tube upstream of the control body, and said throttle chamber being in communication through said throttle with said pressure chamber.

4. The improved fuel injection apparatus as defined in claim 1, wherein:
   (iii) the control body includes an opening which communicates, to a varying extent, with the air induction tube.

5. The improved fuel injection apparatus as defined in claim 1, the apparatus further including: a throttle device mounted to the air induction tube downstream of the control body, said throttle device controlling a cross sectional area of the air induction tube downstream of the cross sectional opening controlled by the circumferential wall of the control body; means connected to the fuel apportionment valve and defining a fuel injection jet, wherein:
   (iii) the fuel injection jet is located to inject fuel from the fuel apportionment valve into the immediate vicinity of the cross sectional area controlled by the throttle device.

6. The improved fuel injection apparatus as defined in claim 5, wherein:
   (iv) the throttle device includes: the arbitrarily actuatable throttle valve; and a coaxially arranged preparation device which cooperates with the throttle valve.

7. The improved fuel injection apparatus as defined in claim 6, the apparatus further including: a return force applying means connected to the preparation device, wherein:
   (v) the air induction tube defines a recess into which the throttle valve is pivoted during an opening movement, and into which the preparation device is subsequently pivoted; said preparation device effecting its subsequent movement against the return force of the return force applying means; and
   (vi) the air induction tube pressure downstream of the preparation device is communicated to the space formed in said recess by the throttle valve and the preparation device via a throttle point defined partly by the preparation device.

8. The improved fuel injection apparatus as defined in claim 7, wherein:
   (vii) the preparation device defines a front surface in which the injection jet terminates.

9. The improved fuel injection apparatus as defined in claim 2, wherein:
   (v) the air flow rate meter further includes: means defining a working chamber; and a working vane mounted for pivotal movement within the working chamber;
   (vi) said working vane dividing the working chamber into two chambers, with the pressure exerted against one side of the working chamber being the pressure upstream of the control body and the pressure exerted against the opposed side of the working chamber being the pressure downstream of the control body, such that a force contacts the working vane and moves the control body against its return force in the direction of an increase of the controlled air induction tube cross sectional opening.

10. The improved fuel injection apparatus as defined in claim 9, wherein:
    (vii) the working vane and the damping vane are arranged outside of the air induction tube cross sectional opening, and in a plane parallel to the air induction tube.

11. The improved fuel injection apparatus as defined in claim 10, wherein:
    (viii) the control body is formed as a tubular segment.

12. The improved fuel injection apparatus as defined in claim 11, wherein:
    (ix) the injection jet is arranged on the tube segment.

13. The improved fuel injection apparatus as defined in claim 10, wherein:
    (viii) the control body is fixed coaxially to the working vane and the damping vane within the air induction tube, and is embodied in the form of an outer surface of a cylinder.

14. The improved fuel injection apparatus as defined in claim 13, wherein:
    (ix) the control body has an airfoil-shaped cross section, viewed transverse to the direction of air flow.

15. The improved fuel injection apparatus as defined in claim 14, the apparatus further including: means connected to the fuel apportionment valve and defining a fuel injection jet, wherein:
    (x) the injection jet is located in the air induction tube wall.

16. The improved fuel injection apparatus as defined in claim 15, the apparatus further including: means defining a sharp-edged stub, and wherein:
    (xi) the sharp-edged stub is provided at the wall of the air induction tube downstream of the injection jet.

17. The improved fuel injection apparatus as defined in claim 16, wherein:
    (xii) the control body has a guide nose which directs the air induced into the air induction tube onto the injection jet.

18. The improved fuel injection apparatus as defined in claim 16, the apparatus further including: a guide body arranged about the bearing shaft, and wherein:
    (xii) the guide body is pivotable in accordance with the pivotal movement of the control body.

* * * * *